US012583691B2

(12) United States Patent
Kuribayashi

(10) Patent No.: US 12,583,691 B2
(45) Date of Patent: Mar. 24, 2026

(54) INDUSTRIAL ROBOT

(71) Applicant: NIDEC INSTRUMENTS CORPORATION, Nagano (JP)

(72) Inventor: Tamotsu Kuribayashi, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 161 days.

(21) Appl. No.: 18/035,289

(22) PCT Filed: Nov. 9, 2021

(86) PCT No.: PCT/JP2021/041102
§ 371 (c)(1),
(2) Date: May 4, 2023

(87) PCT Pub. No.: WO2022/097754
PCT Pub. Date: May 12, 2022

(65) Prior Publication Data
US 2023/0416019 A1 Dec. 28, 2023

(30) Foreign Application Priority Data

Nov. 9, 2020 (JP) ................................. 2020-186270

(51) Int. Cl.
*B65G 47/90* (2006.01)
(52) U.S. Cl.
CPC .................................. *B65G 47/905* (2013.01)
(58) Field of Classification Search
CPC .................................................... B65G 47/905
See application file for complete search history.

(56) References Cited

U.S. PATENT DOCUMENTS

2013/0211571 A1* 8/2013 Teramoto ........... G05B 19/4189
700/112

FOREIGN PATENT DOCUMENTS

| | | | |
|---|---|---|---|
| JP | 10175734 A | * | 6/1998 |
| JP | H10175734 | | 6/1998 |
| JP | 2001217303 | | 8/2001 |
| JP | 2002076097 | | 3/2002 |
| JP | 2003117862 | | 4/2003 |
| JP | 2006060135 | | 3/2006 |

(Continued)

OTHER PUBLICATIONS

"International Search Report (Form PCT/ISA/210) of PCT/JP2021/041102", mailed on Jan. 25, 2022, with English translation thereof, pp. 1-4.

(Continued)

*Primary Examiner* — Gerald McClain
(74) *Attorney, Agent, or Firm* — JCIPRNET

(57) ABSTRACT

The industrial robot includes a hand, and a support member that supports the hand. The hand includes a connecting portion that configures a base end portion of the hand and is connected to the support member, a loading portion that configures a tip end portion of the hand and on which the conveying target is to be loaded, and a plurality of sensing mechanisms that sense the conveying target for correcting a position of the hand. The sensing mechanisms are transmission type optical sensors each including a light emitting portion and a light receiving portion that are positioned to be opposite to each other via a gap in an up-down direction and are positioned on a base end side of the loading portion.

4 Claims, 2 Drawing Sheets

(56)     References Cited

FOREIGN PATENT DOCUMENTS

| | | | | |
|---|---|---|---|---|
| JP | 2006060135 | A * | 3/2006 | |
| JP | 2006272526 | | 10/2006 | |
| JP | 2019102695 | A * | 6/2019 | ....... H01L 21/67259 |
| KR | 20050006425 | | 1/2005 | |

OTHER PUBLICATIONS

"Office Action of China Counterpart Application", issued on Apr. 7, 2025, with English translation thereof, p. 1-p. 10.

* cited by examiner

INDUSTRIAL ROBOT

CROSS-REFERENCE TO RELATED APPLICATION

This application is a 371 application of the International PCT application serial no. PCT/JP2021/041102, filed on Nov. 9, 2021, which claims the priority benefits of Japan Patent Application No. 2020-186270, filed on Nov. 9, 2020. The entirety of each of the above-mentioned patent applications is hereby incorporated by reference herein and made a part of this specification.

TECHNICAL FIELD

The present invention relates to an industrial robot including a hand on which a conveying target is to be loaded.

BACKGROUND ART

Conventionally, an industrial robot for conveying a thin-plate-shaped workpiece is known (for example, see Patent Literature 1). The industrial robot described in Patent Literature 1 includes a hand and an arm to which the hand is rotatably connected, and conveys a workpiece out of a storage cassette in which the workpiece is stored and conveys the workpiece into the storage cassette. The hand includes a hand fork (mounting portion) on which the workpiece is loaded. The hand fork is provided with a vacuum pad for sucking the workpiece to hold it. When the workpiece is conveyed out of or into the storage cassette, the hand fork enters the storage cassette.

The industrial robot described in Patent Literature 1 includes an alignment sensor provided on a tip end side of the hand fork for sensing the workpiece that is to be mounted on the hand fork and correcting the position of the hand. The alignment sensor is a reflection type optical sensor including a light emitting portion and a light receiving portion. The light receiving portion receives light emitted from the light emitting portion and reflected on the surface of the workpiece (specifically, the lower side surface of the workpiece). The alignment sensor senses the position of the end surface of the workpiece stored in the storage cassette.

CITATION LIST

Patent Literature

[Patent Literature 1] JP2006-272526

SUMMARY OF THE INVENTION

Problems to be Solved by the Invention

When the workpiece conveyed by the industrial robot is, for example, a semiconductor wafer, the reflection condition of light on the surface of the semiconductor wafer that is to be conveyed by the industrial robot may vary due to the influence that a variety of materials are used for the material of the semiconductor wafer and a variety of processes are conducted on the surface of the semiconductor wafer. In the industrial robot described in Patent Literature 1, since the alignment sensor is a reflection type optical sensor, the accuracy of the alignment sensor of sensing the semiconductor wafer may decrease when the reflection condition of light on the surface of the semiconductor wafer varies.

According to the above, the object of the present invention is to provide an industrial robot including a sensing mechanism that senses a conveying target for correcting a position of a hand in which it is possible to secure the accuracy of sensing the conveying target by the sensing mechanism when the reflection condition of light on the surface of the conveying target varies.

Means for Solving the Problem

In order to solve the above-described problem, an industrial robot of the present invention is characterized in that: the industrial robot includes a hand on which a conveying target formed to have a thin plate shape is to be loaded, and a support member that supports the hand; wherein the hand includes a connecting portion that configures a base end portion of the hand and is connected to the support member, a loading portion that configures a tip end portion of the hand and on which the conveying target is to be loaded, and a plurality of sensing mechanisms that sense the conveying target for correcting a position of the hand; and the sensing mechanism is a transmission type optical sensor including a light emitting portion and a light receiving portion that are positioned to be opposite to each other via a gap in an up-down direction and is positioned on a base end side of the loading portion.

In the industrial robot of the present invention, the sensing mechanism that senses the conveying target for correcting the position of the hand is a transmission type optical sensor including a light emitting portion and a light receiving portion that are positioned to be opposite to each other via a gap in an up-down direction. Hence, in the present invention, when a reflection condition of light on the surface of the conveying target varies, the accuracy of sensing the conveying target by the sensing mechanism will not be reduced. Therefore, in the present invention, when a reflection condition of light on the surface of the conveying target varies, the accuracy of sensing the conveying target by the sensing mechanism can be secured.

On the other hand, when the sensing mechanism is a transmission type optical sensor, since the light emitting portion and the light receiving portion are positioned so as to sandwich the conveying target in the up-down direction, the sensing mechanism may become larger in the up-down direction. Further, for example, when the loading portion of the hand enters the storage portion in which the conveying target is stored, the parts configuring the storage portion and the sensing mechanism that is larger in the up-down direction may interfere with each other. However, in the present invention, since the sensing mechanism is positioned on the base end side of the loading portion, the sensing mechanism can be positioned so that, when the loading portion enters the storage portion in which the conveying target is stored, the whole sensing mechanism will not enter the storage portion. Therefore, in the present invention, when the sensing mechanism is a transmission type optical sensor and when the structure of the storage portion is not changed, the interference between the parts configuring the storage portion and the sensing mechanism can be prevented.

In the present invention, for example, the conveying target is formed to have a circular plate shape and the hand includes three or more of the sensing mechanisms. In this case, since the hand includes three or more sensing mechanisms, the center position of the conveying target formed to have a circular plate shape can be accurately calculated based on the sensing result of the three or more sensing mechanisms. Further, in this case, since the hand includes three or more sensing mechanisms, when the industrial robot conveys the conveying target having a different diameter, the center position of the conveying target formed to have a circular plate shape can be calculated based on the sensing result of the three or more sensing mechanisms.

In the present invention, for example, the industrial robot includes, as the support member, an arm to which the hand is rotatably connected on a tip end side of the arm, and also includes a main body portion to which a base end side of the arm is rotatably connected.

Effect of the Invention

As described above, the present invention makes it possible to provide an industrial robot including a sensing mechanism that senses a conveying target for correcting a position of a hand in which it is possible to secure the accuracy of sensing the conveying target by the sensing mechanism when the reflection condition of light on the surface of the conveying target varies.

MODE FOR CARRYING OUT THE INVENTION

Hereinafter, an embodiment of the present invention is described with reference to the drawings.

Schematic Configuration of Industrial Robot

Figure 1:
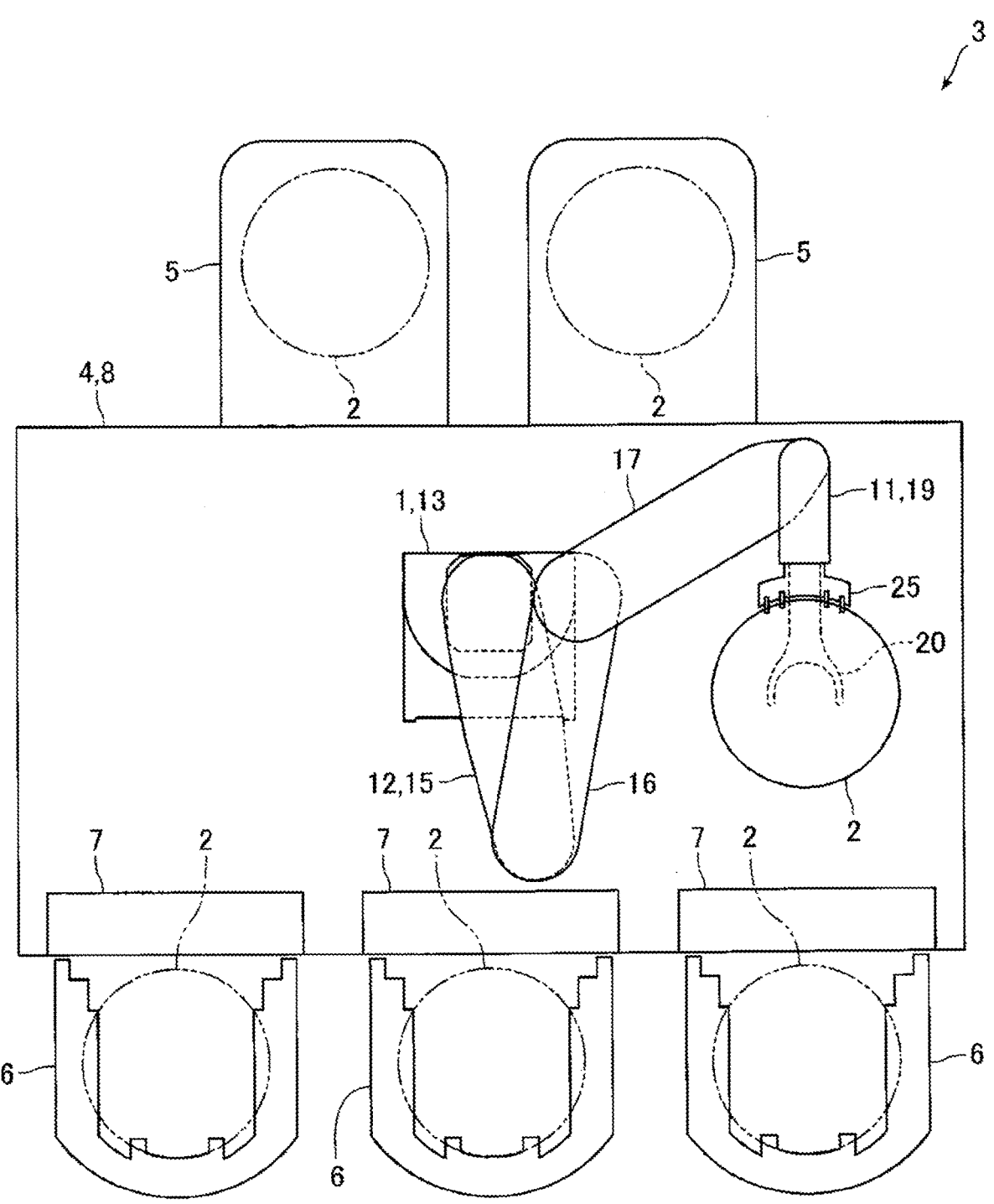
FIG. 1 is a plan view for explaining a schematic configuration of an industrial robot according to an embodiment of the present invention.

FIG. 1 is a plan view for explaining a schematic configuration of an industrial robot 1 according to an embodiment of the present invention.

The industrial robot 1 of this embodiment is a horizontal multi-joint robot for conveying a semiconductor wafer 2 (conveying target). The semiconductor wafer 2 is formed to have a thin plate shape. Specifically, the semiconductor wafer 2 is formed to have a thin circular plate shape. The industrial robot 1 is included in a semiconductor manufacturing system 3 to be used. In an explanation described below, the industrial robot 1 is referred to as "robot 1" and the semiconductor wafer 2 is referred to as "wafer 2".

The semiconductor manufacturing system 3 includes, for example, an Equipment Front End Module (EFEM) 4 and a wafer processing device 5 that conducts a predetermined process on the wafer 2. The robot 1 configures a part of the EFEM 4. Further, the EFEM 4 includes, for example, a plurality of load ports 7 each of which opens and closes a Front Open Unified Pod (FOUP) 6 in which the wafer 2 is stored, and a housing 8 in which the robot 1 is housed.

The FOUP 6 can store a plurality of wafers 2 so that the plurality of wafers 2 are separated from each other by a predetermined distance in an up-down direction and overlaps when seen in the up-down direction. The robot 1 conveys the wafer 2 between the FOUP 6 and the wafer processing device 5. For example, the robot 1 conveys the wafer 2 out of the FOUP 6 and conveys the wafer 2 that has been conveyed out of the FOUP 6 into the wafer processing device 5. Further, the robot 1 conveys the wafer 2 out of the wafer processing device 5 and conveys the wafer 2 that has been conveyed out of the wafer processing device 5 into the FOUP 6.

The robot 1 includes a hand 11 on which the wafer 2 is to be loaded, an arm 12 to which the hand 11 is rotatably connected on the tip end side of the arm 12 and that moves in a horizontal direction, and a main body portion 13 to which the base end side of the arm 12 is rotatably connected. The arm 12 is configured by a first arm portion 15 whose base end side is rotatably connected to the main body portion 13, a second arm portion 16 whose base end side is rotatably connected to the tip end side of the first arm portion 15, and a third arm portion 17 whose base end side is rotatably connected to the tip end side of the second arm portion 16.

The main body portion 13, the first arm portion 15, the second arm portion 16, and the third arm portion 17 are disposed in this order from the lower side in the up-down direction. The main body portion 13 includes an elevation mechanism that elevates the arm 12. Further, the robot 1 includes an arm portion actuation mechanism that rotates the first arm portion 15 and the second arm portion 16 to extend and contract a part of the arm 12 that is composed of the first arm portion 15 and the second arm portion 16, a third arm portion actuation mechanism that rotates the third arm portion 17, and a hand actuation mechanism that rotates the hand 11.

The hand 11 is formed to have a substantially Y-shape when seen in the up-down direction. The hand 11 includes a connecting portion 19 that configures a base end portion of the hand 11 and is connected to the arm 12, and a wafer loading portion 20 as a loading portion that configures a tip end portion of the hand 11 and on which the wafer 2 is to be loaded. The hand 11 is disposed on an upper side of the third arm portion 17 and is supported by the arm 12 from a lower side. The arm 12 of this embodiment is a support member that supports the hand 11. Hereinafter, the specific configuration of the hand 11 is described.

Configuration of Hand and Schematic Action of Industrial Robot

Figure 2:
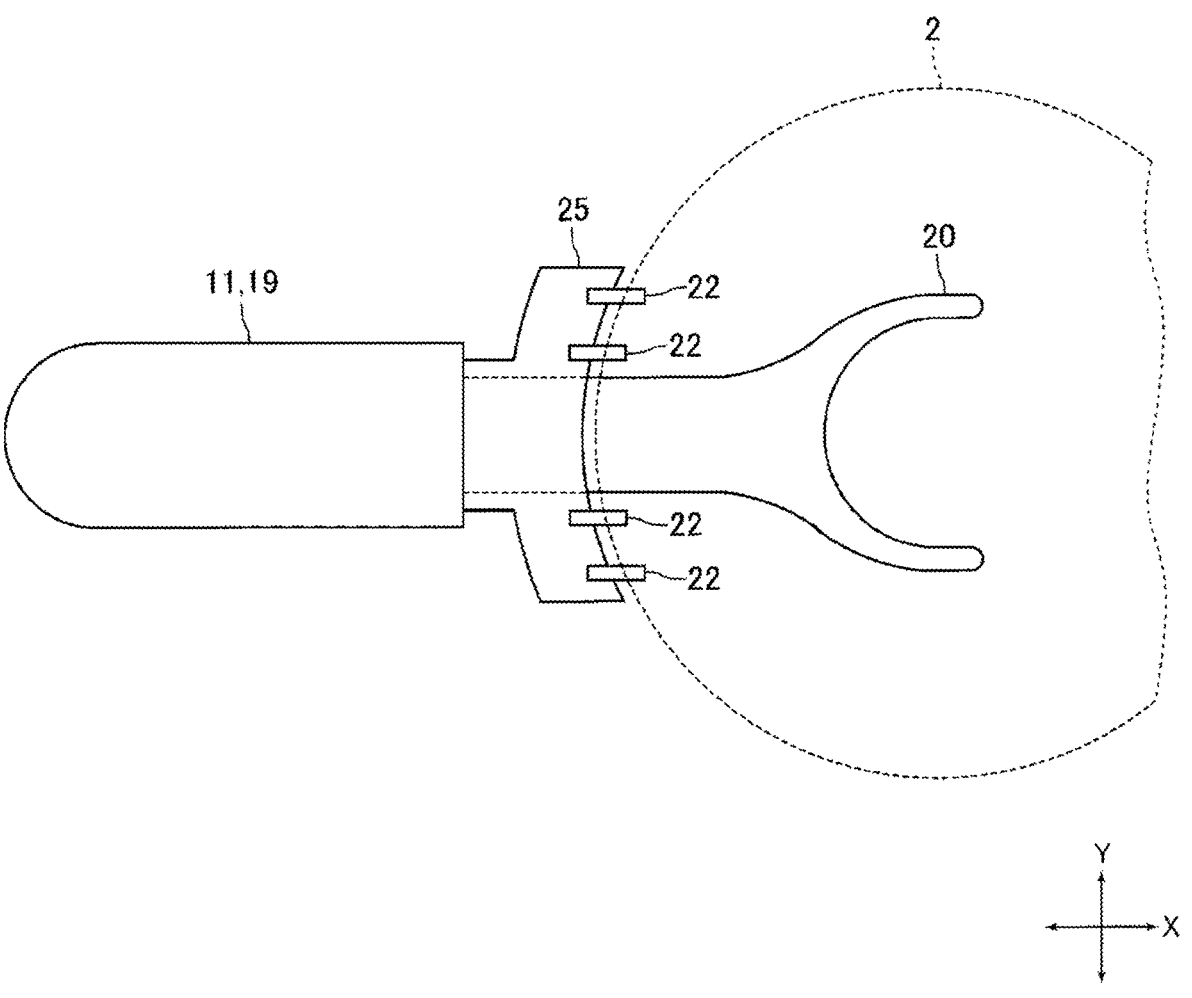
FIG. 2 is a plan view of a hand shown in FIG. 1.
Figure 3:
FIG. 3 is a side view for explaining a configuration of a sensing mechanism shown in FIG. 2.

FIG. 2 is a plan view of the hand 11 shown in FIG. 1. FIG. 3 is a side view for explaining a configuration of a sensing mechanism 22 shown in FIG. 2.

As described above, the hand 11 includes the connecting portion 19 and the wafer loading portion 20. The base end portion of the connecting portion 19 is rotatably connected to the tip end side of the third arm portion 17. The base end of the wafer loading portion 20 is fixed to the tip end of the connecting portion 19. The wafer loading portion 20 is formed to have a flat plate shape and the wafer 2 is to be loaded on the upper surface of the wafer loading portion 20. The thickness direction of the wafer 2 loaded on the upper surface of the wafer loading portion 20 corresponds to the up-down direction. A suction hole (not shown) that sucks the wafer 2 to hold it is formed on the upper surface of the wafer loading portion 20. That is, the hand 11 includes a suction type holding portion for holding the wafer 2 loaded on the wafer loading portion 20.

Further, the hand 11 includes a plurality of sensing mechanisms 22 that sense the wafer 2 for correcting the position of the hand 11. The hand 11 according to this embodiment includes three or more sensing mechanisms 22. Specifically, the hand 11 includes four sensing mechanisms 22. The sensing mechanism 22 is a transmission type optical sensor including a light emitting portion 23 and a light receiving portion 24 that are positioned to be opposite to each other via a gap in the up-down direction. In this embodiment, for example, the light emitting portion 23 is positioned on the lower side and the light receiving portion 24 is positioned above the light emitting portion 23. Further, in this embodiment, for example, the light emitting portion 23 is positioned on a lower side of the wafer loading portion 20 and the light receiving portion 24 is positioned on an upper side of the wafer loading portion 20.

The four sensing mechanisms 22 are fixed to a bracket 25. The bracket 25 is fixed to the tip end portion of the connecting portion 19. That is, the four sensing mechanisms 22 are fixed to the tip end portion of the connecting portion 19 via the bracket 25. The four sensing mechanisms 22 are positioned on the base end side of the wafer loading portion 20. The four sensing mechanisms 22 are disposed at positions each shifted from the base end portion of the wafer loading portion 20 in an orthogonal direction (Y-direction in FIG. 2) that is orthogonal to a longitudinal direction (X-direction in FIG. 2) of the hand 11 having a substantially Y-shape when seen in the up-down direction, and to the up-down direction.

Two sensing mechanisms 22 of the four sensing mechanisms 22 are positioned on one side of the base end portion of the wafer loading portion 20 in the orthogonal direction. The other two sensing mechanisms 22 of the four sensing mechanisms 22 are positioned on the other side of the base end portion of the wafer loading portion 20 in the orthogonal direction. Further, the four sensing mechanisms 22 are disposed so that, when the wafer 2 is loaded at the correct position on the hand 11, the four sensing mechanisms 22 are aligned arcuately along an outer peripheral surface of the wafer 2. The four sensing mechanisms 22 sense, on the base end side of the wafer loading portion 20, the position of the end surface of the wafer 2 that is to be loaded on the wafer loading portion 20.

When, for example, the robot 1 conveys the wafer 2 out of the FOUP 6 to the wafer processing device 5, the four sensing mechanisms 22 sense the position of the end surface of the wafer 2 stored in the FOUP 6 during an action of loading the wafer 2 stored in the FOUP 6 onto the wafer loading portion 20. Further, based on the result of sensing by the four sensing mechanisms 22, the control section of the robot 1 calculates the center position of the wafer 2 to be loaded on the wafer loading portion 20 and calculates displacement between the calculated center position of the wafer 2 and the center position of the wafer 2 when stored at the correct position in the FOUP 6.

Further, the control section of the robot 1 corrects the position of the hand 11 based on the calculated displacement amount of the center position of the wafer 2 when the wafer 2 stored in the FOUP 6 is loaded on the wafer loading portion 20. In another case, the control section of the robot 1 loads the wafer 2 stored in the FOUP 6 onto the wafer loading portion 20 without correcting the position of the hand 11 and conveys the wafer 2 out of the FOUP 6, and, when the wafer 2 is to be placed on a predetermined place on the wafer processing device 5, corrects the position of the hand 11 based on the calculated displacement amount of the center position of the wafer 2.

Note that, the position of the hand 11 when the wafer 2 stored at the correct position in the FOUP 6 is loaded at the correct position on the hand 11, and the position of the hand 11 when the wafer 2 loaded at the correct position on the hand 11 is placed at the correct position on the wafer processing device 5 have been taught to the robot 1.

Main Effect of this Embodiment

As described above, the sensing mechanism 22 of this embodiment is a transmission type optical sensor. Hence, in this embodiment, when a reflection condition of light on the surface of the wafer 2 varies, the accuracy of sensing of the wafer 2 by the sensing mechanism 22 will not be reduced. Therefore, in this embodiment, when a reflection condition of light on the surface of the wafer 2 varies, the accuracy of sensing of the wafer 2 by the sensing mechanism 22 can be secured.

In this embodiment, the sensing mechanism 22 is positioned on the base end side of the wafer loading portion 20. Hence, in this embodiment, the sensing mechanism 22 can be positioned so that, when the wafer loading portion 20 enters the wafer processing device 5 and the FOUP 6 for conveying the wafer 2 into and out of the wafer processing device 5 and the FOUP 6, the whole sensing mechanism 22 will not enter the wafer processing device 5 and the FOUP 6. Therefore, in this embodiment, when the sensing mechanism 22 is the transmission type optical sensor that includes the light emitting portion 23 and the light receiving portion 24 positioned so as to sandwich the wafer 2 in the up-down direction and the size of the sensing mechanism 22 in the up-down direction is relatively large, and when the configurations of the wafer processing device 5 and the FOUP 6 are not changed, interference between parts configuring the wafer processing device 5 or the FOUP 6 and the sensing mechanism 22 can be prevented.

In this embodiment, the hand 11 includes four sensing mechanisms 22. Hence, in this embodiment, the center position of the wafer 2 can be accurately calculated based on the sensing result of the four sensing mechanisms 22. Further, in this embodiment, when the wafer 2 having a different diameter is conveyed by the robot 1, the center position of the wafer 2 can be calculated based on the sensing result of the four sensing mechanisms 22.

Another Embodiment

Although the above-described embodiment is one example of the preferred embodiment of the present invention, the present invention is not limited thereto and can be modified in various ways in a range without altering the gist of the present invention.

In the embodiment described above, the light emitting portion 23 and the light receiving portion 24 may be positioned on the upper side of the wafer loading portion 20, or may be positioned on the lower side of the wafer loading portion 20. Note that, similarly to the above-described embodiment, when the light emitting portion 23 is positioned on the lower side of the wafer loading portion 20 and the light receiving portion 24 is positioned on the upper side of the wafer loading portion 20, right after the sensing mechanism 22 senses the end surface of the wafer 2, the hand 11 can be moved in such a direction that the connecting portion 19 approaches to the wafer 2 to load the wafer 2 on the wafer loading portion 20. However, when the light emitting portion 23 and the light receiving portion 24 are positioned on the upper side or the lower side of the wafer loading portion 20, the hand 11 needs to be moved once in such a direction that the connecting portion 19 separates from the wafer 2 after the sensing mechanism 22 senses the end surface of the wafer 2 and before the wafer 2 is loaded on the wafer loading portion 20.

In the embodiment described above, the hand 11 may not include a holding portion for holding the wafer 2 loaded on the wafer loading portion 20. In this case, for example, a mounting member on which the wafer 2 is to be mounted is provided on the upper surface side of the wafer loading portion 20. The mounting member is, for example, made of rubber. In the case of this hand 11, the wafer 2 is simply mounted on the mounting member, and the wafer 2 loaded on the hand 11 is not held by the hand 11. Further, in the case of this hand 11, the wafer 2 loaded on the hand 11 is not positioned in the horizontal direction.

In the embodiment described above, the number of the sensing mechanisms 22 included in the hand 11 may be three, or may be five or more. Further, when the wafers 2 that are to be conveyed by the robot 1 have a constant diameter, the number of the sensing mechanisms 22 included in the hand 11 may be two. Further, in the embodiment described above, the robot 1 may include two hands 11 that are rotatably connected to the tip end side of the arm 12. Still further, in the embodiment described above, the arm 12 may be configured by two arm portions, or may be configured by four or more arm portions.

In the embodiment described above, the conveying target that is to be conveyed by the robot 1 may be other than the wafer 2. In this case, for example, the conveying target may be formed to have a thin circular plate shape, or may be formed to have a square thin flat plate shape or a rectangular thin flat plate shape. Further, an industrial robot to which the present invention is to be applied may be a robot other than a horizontal multi-joint industrial robot. For example, an industrial robot to which the present invention is to be applied may be an industrial robot including a linear drive portion that linearly reciprocates the hand 11. In this case, for example, the linear drive portion includes a slider to which the hand 11 is connected and that slides straightly. In this case, the slider is a support member that supports the hand 11.

The invention claimed is:

1. An industrial robot, comprising:

a hand on which a conveying target formed to have a thin plate shape is to be loaded, and an arm that supports the hand; wherein the hand comprises a connecting portion that configures a base end portion of the hand and is connected to the arm, a tip end portion of the hand on which the conveying target is to be loaded being connected to a tip end portion of the connecting portion, and a plurality of sensing mechanisms that sense the conveying target for correcting a position of the hand, the hand is equipped with a bracket fixed to the tip end portion of the connecting portion, a tip end side of the bracket being formed in an arc shape when being viewed in an up-down direction, a part of a region of the bracket overlaps a part of a region of the tip end portion of the hand when being viewed in the up-down direction, the sensing mechanisms comprises four transmission type optical sensors, the four transmission type optical sensors being fixed to the tip end side of the bracket, and two of the four transmission type optical sensors are positioned on one side of a base end part of the tip end portion of the hand in an orthogonal direction and the other two of the four transmission type optical sensors are positioned on the other side of the base end part of the tip end portion of the hand in the orthogonal direction, so that the four transmission type optical sensors are aligned in an arc along an outer peripheral surface of the conveying target when the conveying target is loaded at a correct position on the hand, the orthogonal direction being a direction orthogonal to a longitudinal direction of the hand.

2. The industrial robot according to claim 1, wherein the conveying target is formed to have a circular plate shape.

3. The industrial robot according to claim 1, wherein the hand is rotatably connected on a tip end side of the arm, and the industrial robot also comprises a main body portion to which a base end side of the arm is rotatably connected.

4. The industrial robot according to claim 2, wherein the hand is rotatably connected on a tip end side of the arm, and the industrial robot also comprises a main body portion to which a base end side of the arm is rotatably connected.

\* \* \* \* \*